US012659732B2

(12) United States Patent (10) Patent No.: US 12,659,732 B2
Boisset et al. (45) Date of Patent: *Jun. 16, 2026

(54) METHOD FOR AUTHENTICATING A CENTRAL UNIT CONNECTED TO PERIPHERAL UNITS USING A SECURE SERVER

(71) Applicant: Continental Automotive Technologies GmbH, Hannover (DE)

(72) Inventors: Jean-Philippe Boisset, Montauban (FR); Stefan Abeling, Ulm (DE)

(73) Assignee: Continental Automotive Technologies GmbH, Hannover (DE)

( * ) Notice: Subject to any disclaimer, the term of this patent is extended or adjusted under 35 U.S.C. 154(b) by 22 days.

This patent is subject to a terminal disclaimer.

(21) Appl. No.: 18/839,145

(22) PCT Filed: Apr. 21, 2023

(86) PCT No.: PCT/EP2023/060510
§ 371 (c)(1),
(2) Date: Aug. 16, 2024

(87) PCT Pub. No.: WO2023/208780
PCT Pub. Date: Nov. 2, 2023

(65) Prior Publication Data
US 2025/0168631 A1 May 22, 2025

(30) Foreign Application Priority Data

Apr. 27, 2022 (FR) ...................................... 2203921

(51) Int. Cl.
*H04W 12/0431* (2021.01)
*H04W 4/40* (2018.01)
*H04W 12/033* (2021.01)

(52) U.S. Cl.
CPC ......... *H04W 12/0431* (2021.01); *H04W 4/40* (2018.02); *H04W 12/033* (2021.01)

(58) Field of Classification Search
CPC . H04W 12/0431; H04W 4/40; H04W 12/033; H04W 12/37; H04W 12/71;
(Continued)

(56) References Cited

U.S. PATENT DOCUMENTS 6,556,904 B1 * 4/2003 Larson ................... G07C 5/008
701/34.3
8,683,194 B2 * 3/2014 Battistello ............. H04L 9/3213
726/10
(Continued)

FOREIGN PATENT DOCUMENTS

CN 110808829 A 2/2020
FR 3084310 A1 1/2020
WO 2011039460 A2 4/2011

OTHER PUBLICATIONS

Solomon et al., LiMon—Lightweight Authentication for Tire Pressure Monitoring Sensors, Springer, 2016 (Year: 2016).*
(Continued)

*Primary Examiner* — David Garcia Cervetti
(74) *Attorney, Agent, or Firm* — Buchanan Ingersoll & Rooney PC

(57) ABSTRACT

A method for authenticating the rights of a central unit communicating with peripheral units carrying out measurements on the tires of the wheels of a motor vehicle to carry out sensitive operations thereon, using a secure external server that possesses their identifier. Each peripheral unit generating a random session code transmitted to the server with its identifier, the identifier of the peripheral unit and the session code, the server performs an encryption with a dynamic encryption key shared with the peripheral unit to form a dynamic first encryption key, then performs a second (Continued)

encryption with the identifier of the central unit to give encrypted central-unit information transmitted to the peripheral unit, which performs the same encryption to form a temporary second encryption key, then an inverse decryption giving a decrypted identifier, then compares this decrypted identifier with the identifier of the central unit with a view to granting its authentication.

9 Claims, 2 Drawing Sheets

(58) Field of Classification Search
CPC ..... H04W 84/18; H04W 4/38; H04W 12/009; H04W 12/069; H04W 12/041; H04W 12/06; B60C 23/0462; B60C 23/0479; H04L 63/0435; H04L 63/062; H04L 63/083; H04L 63/0876; H04L 9/3271; H04L 2209/84
See application file for complete search history.

(56) References Cited

U.S. PATENT DOCUMENTS

| | | | | |
|---|---|---|---|---|
| 9,086,941 | B1 * | 7/2015 | Siegel | H04L 67/55 |
| 10,231,125 | B2 * | 3/2019 | Spaur | H04L 9/3263 |
| 10,245,904 | B1 * | 4/2019 | Van Wiemeersch | H04W 12/106 |
| 10,447,483 | B1 * | 10/2019 | Su | H04L 9/3226 |
| 11,080,387 | B1 * | 8/2021 | Lattin | G06F 21/121 |
| 11,945,447 | B2 * | 4/2024 | McFarland, Jr. | G07C 5/0841 |
| 12,170,895 | B2 * | 12/2024 | Bill | B60C 23/0462 |
| 2004/0178897 | A1 * | 9/2004 | Fennel | B60C 23/0416 340/442 |
| 2006/0111111 | A1 * | 5/2006 | Ovadia | H04W 36/38 455/439 |
| 2007/0112773 | A1 * | 5/2007 | Joyce | G06F 8/64 707/999.009 |
| 2007/0162746 | A1 * | 7/2007 | Kwon | H04L 61/2564 713/164 |
| 2007/0229242 | A1 * | 10/2007 | Kato | B60C 23/0444 340/447 |
| 2007/0247281 | A1 * | 10/2007 | Shimomura | B60R 25/403 340/426.11 |
| 2007/0255948 | A1 * | 11/2007 | Ali | G06F 21/57 713/164 |
| 2008/0033609 | A1 * | 2/2008 | Razavi | G01M 17/00 701/31.4 |
| 2008/0104706 | A1 * | 5/2008 | Karp | H04L 63/0428 726/26 |
| 2009/0300595 | A1 * | 12/2009 | Moran | G06F 8/65 717/173 |
| 2010/0148923 | A1 * | 6/2010 | Takizawa | B60R 25/252 340/5.82 |
| 2011/0098075 | A1 * | 4/2011 | Bienas | H04L 63/0209 455/517 |
| 2012/0116575 | A1 * | 5/2012 | Prosser | B60L 53/18 705/14.38 |
| 2012/0191971 | A1 | 7/2012 | Battistello et al. | |
| 2013/0318357 | A1 * | 11/2013 | Abraham | G06F 21/64 713/168 |
| 2014/0114497 | A1 * | 4/2014 | Miyake | B60R 16/0231 701/1 |
| 2014/0156137 | A1 * | 6/2014 | Mayer | G06F 11/3636 714/45 |
| 2015/0045013 | A1 * | 2/2015 | Simmons | H04W 4/80 455/420 |
| 2015/0088370 | A1 * | 3/2015 | Vangelov | G07C 5/0858 701/33.2 |
| 2015/0245204 | A1 * | 8/2015 | Heydon | H04L 43/10 713/171 |
| 2015/0271201 | A1 * | 9/2015 | Ruvio | H04L 67/12 726/23 |
| 2015/0277942 | A1 * | 10/2015 | Rork | G06F 9/44505 701/31.4 |
| 2016/0036586 | A1 * | 2/2016 | Murakami | H04L 9/14 380/270 |
| 2016/0065369 | A1 * | 3/2016 | Kakutani | H04L 9/0897 380/286 |
| 2016/0173458 | A9 * | 6/2016 | Alculumbre | H04L 9/0825 713/153 |
| 2016/0330182 | A1 * | 11/2016 | Jeon | H04W 12/06 |
| 2017/0006001 | A1 * | 1/2017 | Narayan | H04L 63/0281 |
| 2017/0108859 | A1 * | 4/2017 | Xu | H04W 12/06 |
| 2017/0136834 | A1 * | 5/2017 | Chong | B60C 23/0433 |
| 2018/0048473 | A1 * | 2/2018 | Miller | G06F 21/57 |
| 2018/0119975 | A1 * | 5/2018 | Park | G06F 21/602 |
| 2018/0145991 | A1 * | 5/2018 | McCauley | H04L 9/0891 |
| 2018/0217828 | A1 * | 8/2018 | Madrid | H04L 9/3247 |
| 2019/0018669 | A1 * | 1/2019 | Cook | G06F 16/2365 |
| 2019/0028267 | A1 * | 1/2019 | Takemori | H04L 9/3242 |
| 2019/0075089 | A1 * | 3/2019 | Zarubin | H04L 9/083 |
| 2019/0095187 | A1 * | 3/2019 | Benedek | G06F 9/44521 |
| 2019/0184774 | A1 * | 6/2019 | Okada | G07C 5/0808 |
| 2019/0184775 | A1 * | 6/2019 | Van Wiemeersch | H04W 12/106 |
| 2019/0187971 | A1 * | 6/2019 | Wang | H04W 12/06 |
| 2019/0261176 | A1 * | 8/2019 | Yamazaki | H04L 63/061 |
| 2019/0356482 | A1 * | 11/2019 | Nix | H04W 12/041 |
| 2020/0021679 | A1 * | 1/2020 | Yun | H04L 9/0894 |
| 2020/0029213 | A1 * | 1/2020 | Nölscher | B60R 25/24 |
| 2020/0045025 | A1 * | 2/2020 | Toofan | H04L 63/08 |
| 2020/0062049 | A1 * | 2/2020 | Wagner | B60C 23/0422 |
| 2020/0125117 | A1 * | 4/2020 | Switkes | H04W 4/029 |
| 2020/0207163 | A1 * | 7/2020 | Schwegler | B60C 23/0462 |
| 2020/0211301 | A1 * | 7/2020 | Zhang | H04L 63/065 |
| 2020/0213287 | A1 * | 7/2020 | Zhang | H04L 63/123 |
| 2020/0298975 | A1 * | 9/2020 | Ma | H04L 63/0807 |
| 2021/0026347 | A1 * | 1/2021 | Nakashima | G05D 1/0016 |
| 2021/0243176 | A1 * | 8/2021 | Takatsuka | G06F 21/85 |
| 2021/0288806 | A1 * | 9/2021 | Wakita | H04L 9/0869 |
| 2021/0289356 | A1 * | 9/2021 | Okuda | H04W 12/63 |
| 2022/0086934 | A1 * | 3/2022 | Bill | B60C 23/0472 |
| 2022/0124086 | A1 * | 4/2022 | Gao | H04L 63/0876 |
| 2022/0167156 | A1 * | 5/2022 | Yasui | H04L 9/3268 |
| 2022/0180288 | A1 * | 6/2022 | Mezaael | G06Q 10/06398 |
| 2022/0256348 | A1 * | 8/2022 | McGROTTY | H04W 4/80 |
| 2022/0353075 | A1 * | 11/2022 | Bond | H04L 9/0866 |
| 2022/0391916 | A1 * | 12/2022 | Varia | G06Q 30/012 |
| 2023/0063428 | A1 * | 3/2023 | Nadiminti | H04L 63/126 |
| 2023/0084842 | A1 * | 3/2023 | Ng | H04W 4/50 701/32.7 |
| 2023/0198784 | A1 * | 6/2023 | Miller | H04L 63/0869 713/151 |
| 2024/0007296 | A1 * | 1/2024 | Elorch | H04L 9/0894 |
| 2024/0217275 | A1 * | 7/2024 | Dudar | B60C 23/0484 |
| 2024/0239143 | A1 * | 7/2024 | Schubert | B60C 23/0471 |
| 2024/0281243 | A1 * | 8/2024 | Francis | G06F 8/65 |
| 2024/0391278 | A1 * | 11/2024 | Schubert | H04W 12/106 |
| 2025/0159479 | A1 * | 5/2025 | Boisset | H04W 12/069 |
| 2025/0168631 | A1 * | 5/2025 | Boisset | H04W 12/37 |

OTHER PUBLICATIONS

Syed Hridoy, Lightweight Authenticated Encryption for Vehicle Controller Area Network, Queen's University, May 2020 (Year: 2020).*

International Search Report (PCT/ISA/210) and Written Opinion (PCT/ISA/237) with English Translation, mailed on May 31, 2023 by the European Patent Office as the International Searching Authority for International Application No. PCT/EP2023/060510. (21 pages).

Search Report mailed on Nov. 14, 2022 by the French Patent Office for Application No. 2203921, with English Translation. (40 pages).

* cited by examiner

METHOD FOR AUTHENTICATING A CENTRAL UNIT CONNECTED TO PERIPHERAL UNITS USING A SECURE SERVER

CROSS REFERENCE TO RELATED APPLICATIONS

This application is the U.S. National Phase Application of PCT International Application No. PCT/EP2023/060510, filed Apr. 21, 2023, which claims priority to French Patent Application No. 2203921, filed Apr. 27, 2022, the contents of such applications being incorporated by reference herein.

FIELD OF THE INVENTION

The present invention relates to a method for authenticating the rights of a central unit to communicate with peripheral wheel units using a secure server connected by an Internet link, in order to carry out sensitive operations on these peripheral units, and to units and a motor vehicle comprising devices implementing this method.

BACKGROUND OF THE INVENTION

One type of method for communicating between a tire-pressure monitoring system (TPMS) of a motor vehicle and a smart device of a user of this vehicle, which is in particular described in the document FR-A1-3084310, incorporated by reference herein, comprises one peripheral unit installed on each wheel of the vehicle, which unit measures parameters, such as the inflation pressure and the temperature of the tire, that are transmitted by radio, and particularly using the Bluetooth standard, to a central unit located in the vehicle, which receives the information in order to process it and inform/alert the driver or a repairer should a problem be detected.

In particular, the wheel units periodically transmit information to the central unit, using a specific unique identifier allowing the wheel in question to be identified. Each wheel unit also possesses a radio receiver that receives signals from the central unit, in order to perform diagnostic, configuration or learning operations on this wheel unit.

The method employs UHF waves (UHF standing for Ultra-High Frequency) the frequency of which exceeds one gigahertz, allowing new applications such as exchange with devices exterior to the vehicle, in particular a smart phone of the user.

Moreover, generally, in the case of a system carrying out radio exchanges between a central unit of a user or client and peripheral units recording data, for example for these tire-pressure monitoring systems, it may be necessary to perform sensitive operations on these peripheral units, such as reprogramming them, using the Internet and cloud-computing services.

Each unit possesses as identifier a specific MAC address stored in a physical memory (MAC standing for Medium Access Control). Authentication of the central unit of the user by the peripheral units with a view to carrying out sensitive operations such as reprogramming thereon is problematic, as it is difficult, simply, without burdening the server with exchanges of large volumes of data, to ensure a high level of security in order to avoid undesirable interventions by third parties such as cracking, and the confidentiality of the data exchanges.

The aim of the present invention is in particular to avoid these problems of the prior art.

SUMMARY OF THE INVENTION

To this end it proposes a method for authenticating the rights of a central unit of a user communicating bidirectionally by radio with one or more peripheral units carrying out measurements on the tires of the wheels of a motor vehicle, which measurements are transmitted to this central unit, to carry out sensitive operations thereon, each central unit and peripheral unit possessing a specific identifier, this method using via the Internet a secure external server that possesses in a database the identifier of the peripheral wheel units, and a symmetric encryption key that is shared with each peripheral wheel unit, this method being noteworthy in that it comprises the following successive steps:

in a first step, the central unit uses its identifier and a password to have itself recognized by each peripheral wheel unit, while in parallel the central unit sets up a secure link with the server by authenticating itself so that the server may recognize in its database the identifier of the peripheral wheel unit in question;

in a second step, the peripheral wheel unit generates a new random session code and notifies the central unit thereof;

in a third step, the central unit transmits to the server its identifier, the identifier of the peripheral wheel unit and the session code to ask it for proof of its authentication in order to obtain administrative rights over this peripheral wheel unit;

the server performs, in a fourth step, a first encryption with the shared encryption key recognized by its identifier, and with the session code to form a random and shared dynamic temporary first encryption key, then performs, in a fifth step, a second encryption with the identifier of the central unit and this dynamic temporary first encryption key to give encrypted central-unit information by way of proof of authentication;

in a sixth step, the encrypted central-unit information is transmitted to the central unit, then, in a seventh step, the central unit transmits it in turn to the peripheral wheel unit;

the peripheral wheel unit performs in parallel, in an eighth step, the same first encryption as the one performed by the server in its fourth step, with its shared encryption key and its session code, to form a temporary second encryption key, then it performs, in a ninth step, an inverse decryption of the second encryption of the fifth step, with the temporary second encryption key and the encrypted information giving a decrypted identifier; and lastly in a tenth step, the peripheral wheel unit compares the decrypted identifier with the identifier of the central unit so as, if they coincide, to grant this central unit its authentication.

One advantage of the authenticating method according to an aspect of the invention is that it allows the procedure of encryption of the source files stored in the server to be simplified, in order to avoid overloading this server, the encrypted files being created only once for all the peripheral wheel units.

The method for authenticating rights according to an aspect of the invention may further comprise one or more of the following features, which may be combined with one another.

Advantageously, in a following step, the secure server generating and hosting a dynamic special encryption key uses it to encrypt a software source file giving an encrypted file, then, in a following step, the server uses the dynamic shared first encryption key to encrypt the special encryption key thereby giving a new encrypted key, then, in a following step, the server delivers to the central unit the encrypted file and the new encrypted key, this central unit delivering them in turn in a following step to the peripheral wheel unit.

In this case, advantageously, in a following step, the peripheral wheel unit uses the new encrypted key and the dynamic temporary first encryption key to form the same special encryption key as the one held by the server, then, in a following step, the peripheral wheel unit uses the special encryption key to decrypt the encrypted file with an inverse operation to the encryption operation carried out previously by the server, in order to deliver the source file.

Advantageously, the source file is then verified with a checksum before being programmed into the memory of the peripheral wheel unit.

Advantageously, the secure link with the server uses an HTTPS protocol, HTTPS standing for HyperText Transfer Protocol Secure.

Advantageously, once the secure link with the server has been set up, the server verifies in its database whether the central unit is authorized to communicate with the peripheral wheel units.

Advantageously, during a given communication session opened with the peripheral wheel unit, the central unit again sends it the encrypted information by way of proof of authentication without using the server.

Another aspect of the invention is a system comprising a central unit, and peripheral wheel units carrying out measurements, which are connected to one another by radio, comprising devices implementing a method comprising any one of the preceding features.

An aspect of the invention also relates to a motor vehicle comprising a central unit, and peripheral wheel units carrying out measurements on the tires of the wheels of this vehicle, comprising devices implementing a method comprising any one of the preceding features.

DETAILED DESCRIPTION OF EXEMPLARY EMBODIMENTS

Figure 1:
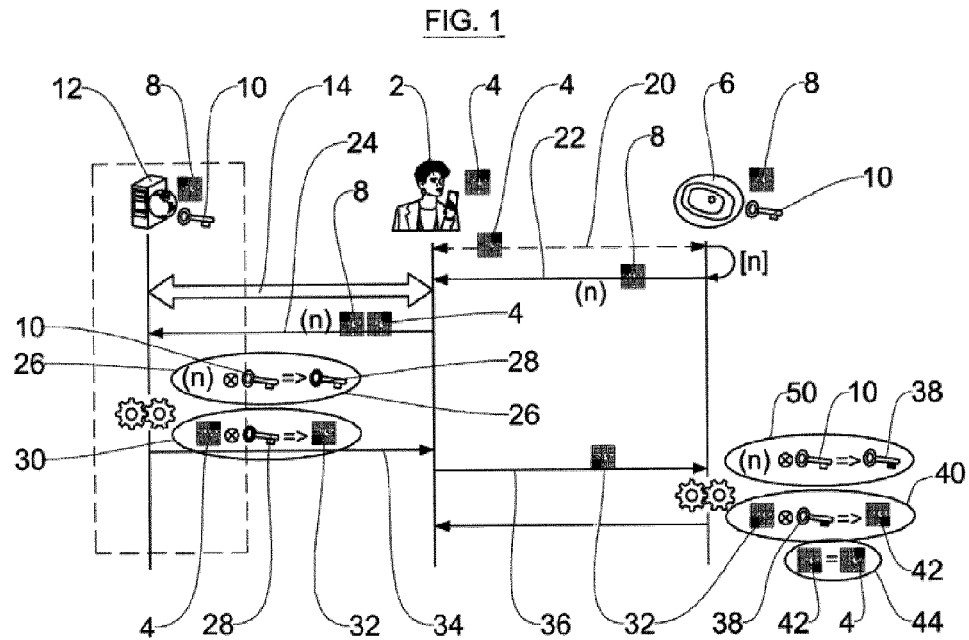
FIG. 1 is a functional schematic showing the method according to an aspect of the invention for authenticating a central unit located in a motor vehicle, which unit is connected to peripheral wheel units that are fastened to the wheels of the vehicle.

FIG. 1 shows, in a motor vehicle, a central unit 2 that forms a client having available to it a central-unit identifier 4 and, on each wheel, one peripheral wheel unit 6 that comprises sensors of the pressure and temperature of the tire of the wheel, and that has available to it a peripheral wheel unit identifier 8 and a symmetric shared specific encryption key 10, recorded during manufacture of this unit. The central unit 2 and the peripheral wheel units 6 communicate with each other in particular using the using Bluetooth® standard.

An Internet network 14 using a radio link allows the central unit 2 to be connected to a secure external server 12 containing a database comprising, for each peripheral wheel unit 6, its identifier 8 and its shared encryption key 10.

The method for authenticating the central unit 2, to allow sensitive operations to be carried out on the peripheral wheel units 6, comprises a first step 20 of using the identifier of the central unit 4 and a password to have the central unit recognized by the one specific peripheral wheel unit 6, and the connection accepted.

In parallel, the central unit 2 is connected by a secure link 14 to the server 12, so that the server may recognize in its database the identifier of the specific unit 6 in question. Advantageously, a secure HTTPS link is used (HTTPS standing for HyperText Transfer Protocol Secure), for example one set up with the identifier of the central unit 4 and a password.

In a second step 22, the peripheral wheel unit 6 generates a new session code, which may in particular be a random session number (n), and notifies the central unit 2 thereof.

In a third step 24, the central unit 2 transmits to the server 12 its identifier 4, the identifier 8 of the peripheral wheel unit 6 and the session number (n) to ask it for proof of its authentication in order to obtain administrative rights over this peripheral wheel unit. The server 12 then verifies in its database whether the central unit 2 is authorized to communicate with this peripheral wheel unit 6, using their respective identifiers 4, 8.

If the central unit 2 is authorized to communicate with the peripheral wheel unit 6, in a fourth step 26 the server 12 performs a first encryption with the shared encryption key 10, which is recognized by its identifier 8, and with the session number (n) to form a random and shared dynamic temporary first encryption key 28.

The server 12 then performs, in a fifth step 30, a second encryption with the identifier of the central unit 4 and this dynamic temporary first encryption key 28 in order to produce encrypted central-server information 32 forming a proof of authentication.

In a sixth step 34, the server 12 transmits to the central unit 2 the encrypted proof-of-authentication information 32. In a seventh step 36, the central unit 2 in turn transmits to the particular unit 6 the encrypted proof-of-authentication information 32.

In parallel with the operations performed by the secure server 12, in an eighth step 50 the peripheral wheel unit 6 performs the same fourth step of first encryption 26 carried out by the server 12, by using its shared encryption key 10 and its session number (n) to form a temporary second encryption key 38. The peripheral wheel unit 6 then performs, in a ninth step 40, an inverse decryption of the fifth step 30 of the second encryption, with the temporary second encryption key 38 and the encrypted proof-of-authentication information 32, giving a decrypted identifier 42.

In a final tenth step 44, the peripheral wheel unit 6 compares the decrypted identifier 42 with the identifier of the central unit 4, and, if they coincide, it then grants this central unit its authentication. In this way, a validation is obtained by the remote secure server 12 of the authentication of the central unit 2, which is then authorized to perform on the peripheral wheel unit 6 sensitive operations such as its reprogramming with a high level of security and confidentiality.

With this method, the central unit 2 may subsequently again give this proof to the peripheral wheel unit 6, without recourse to the server 12, but only during the same communication session with this peripheral wheel unit. In this way an external person wanting to crack the system by seeking to connect during the following session will not be capable of giving this proof again and will not be able to pass themselves off as the client.

Figure 2:
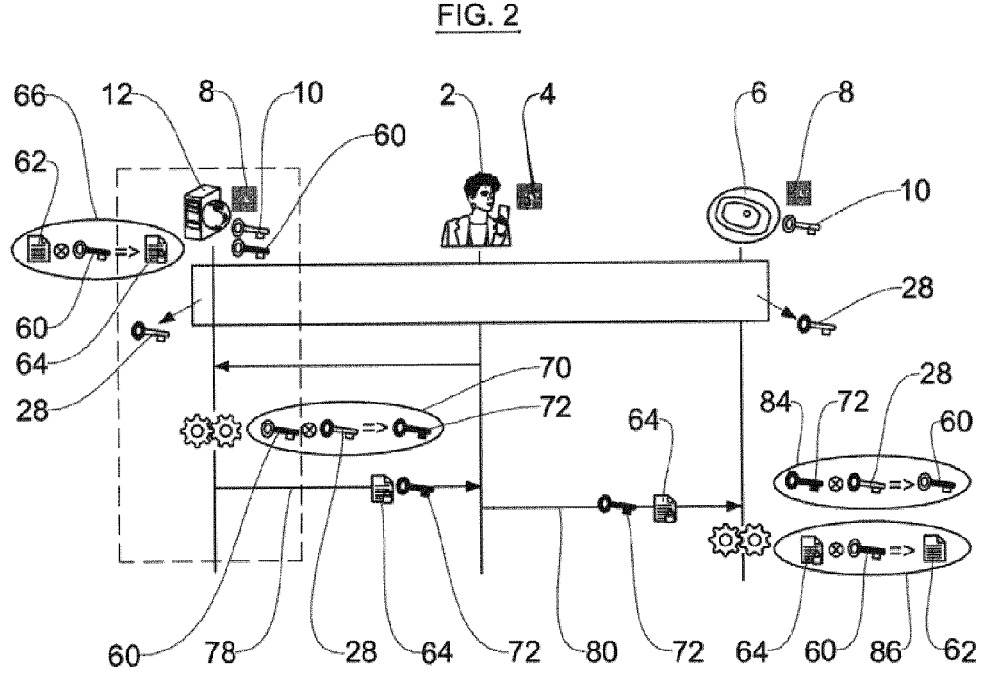
FIG. 2 is a functional schematic showing, after this authentication, reprogramming of peripheral wheel units.

FIG. 2 shows the secure server 12 generating and hosting a dynamic special encryption key 60 that is used, in an encryption operation 66, to encrypt a software source file 62 thereby giving an encrypted file 64 that is to be loaded into the peripheral wheel unit 6. In all cases, the server 12 keeps an identical image of the file present in the peripheral wheel unit 6. In particular, the dynamic special encryption key 60 may be unique and used to encrypt a single source file 62, or may be used to encrypt every file.

After the preceding sequence of authentication of the central unit 2, the central unit 2 having obtained the status of administrator, the dynamic temporary first encryption key 28 is shared between the server 12 and the peripheral wheel unit 6.

In a following step 70, the server 12 uses the shared dynamic temporary first encryption key 28 to encrypt the special encryption key 60, thereby giving a new encrypted key 72 that may be shared with the peripheral wheel unit 6.

In a following step 78, the server 12 delivers to the central unit 2 the encrypted file 64 and the new encrypted key 72, this central unit delivering them in turn, in a following step 80, to the peripheral wheel unit 6.

In a following step 84, the peripheral wheel unit 6 uses the new encrypted key 72 and the new shared dynamic encryption key 28 to form the same special encryption key 60 as the one held by the server 12. Lastly, in a following step 86, the peripheral wheel unit 6 uses the special encryption key 60 to decrypt the encrypted file 64 with an inverse operation to the encryption operation 66 carried out previously by the server 12, in order to deliver the source file 62. The source file 62 is then verified with a checksum, then it is programmed into the memory of the peripheral wheel unit 6 with a view to being used.

The principle of the method according to an aspect of the invention is to always use the same special encryption key 60 to encode the files 62, this avoiding the systematic encoding phase. Since the special encryption key 60 is unknown to the peripheral wheel units 6, the new encrypted key 72 is transmitted encrypted by virtue of the shared dynamic encryption key 28 advantageously created during the authenticating phase.

Decryption of the encrypted key 72 is not possible on the central unit 2, since a cracker does not possess the shared dynamic temporary encryption key 28 created after authentication. This method remains secure provided that the special encryption key 60 is not known to crackers.

Advantageously, the encryptions and decryptions are performed according to AES-128 (AES standing for Advanced Encryption Standard).

The authenticating method according to an aspect of the invention is particularly suitable for monitoring tires of a motor vehicle, in order to signal faults to the user or to a repairer or to prevent them. It also allows motor-vehicle manufacturers or tire manufacturers to receive information on an external server with a view to track its products and improve quality.

The invention claimed is:

1. A method for authenticating the rights of a central unit of a user communicating bidirectionally by radio with one or more peripheral wheel units carrying out measurements on the tires of the wheels of a motor vehicle, which measurements are transmitted to this central unit, to carry out sensitive operations thereon, each central unit and peripheral wheel unit possessing a central unit identifier and a peripheral wheel unit identifier, respectively, this method using via the Internet a secure external server that possesses in a database the peripheral wheel unit identifiers of the peripheral wheel units, and a symmetric encryption key that is shared with each peripheral wheel unit, the method comprising:

communicating, by the central unit, an identifier and a password to each peripheral wheel unit, and authentication information to the server for establishing a secure link so that the server may recognize the peripheral wheel unit identifier of a target peripheral wheel unit of the one or more peripheral wheel units;

generating, by the target peripheral wheel unit a new random session code and sending the new random session code to the central unit;

transmitting, by the central unit to the server, the central unit identifier, the peripheral wheel unit identifier of the target peripheral wheel unit, and the new random session code, to request a proof of authentication so that the central unit obtains administrative rights over the target peripheral wheel unit;

performing, by the server, a first encryption using the shared encryption key recognized by a server identifier and the new random session code to form a random and shared dynamic temporary first encryption key;

performing, by the server, a second encryption using the central unit identifier and the dynamic temporary first encryption key to generate encrypted central-unit information for proof of authentication;

transmitting, by the server, encrypted central-unit information to the central unit;

transmitting, by the central unit, the encrypted central-unit information to the target peripheral wheel unit;

performing, by the target peripheral wheel unit, the first encryption using the shared encryption key and the new random session code, to form a temporary second encryption key;

decrypting, by the target peripheral wheel unit, the encrypted central-unit information using the temporary second encryption key to obtain a decrypted identifier;

comparing, by the target peripheral wheel unit, the decrypted identifier with the central unit identifier; and authenticating the central unit when the comparison results in a match.

2. The method as claimed in claim 1, further comprising, generating and hosting, by the server, a dynamic special encryption key to encrypt a software source file;

encrypting, by the server, the special encryption key using the dynamic temporary first encryption key to obtain a new encrypted key;

delivering, by the server to the central unit, the encrypted software source file and the new encrypted key; and delivering, by the central unit, the encrypted software source file and the new encrypted key to the peripheral wheel unit.

3. The method as claimed in claim 2, further comprising:

using, by the peripheral wheel unit, the new encrypted key and the new shared dynamic encryption key to form a second special encryption key that matches the special encryption key held by the server; and using, by the peripheral wheel unit, the special encryption key to decrypt the encrypted software source file to obtain the software source file.

4. The method as claimed in claim 3, further comprising:

verifying the software source file with a checksum before programming the software source file into the memory of the peripheral wheel unit.

5. The method as claimed in claim 1, wherein the secure link with the server uses an HTTPS protocol, HTTPS standing for HyperText Transfer Protocol Secure.

6. The method as claimed in claim 1, wherein once the secure link with the server has been set up, the method further comprises:

verifying, by the server, whether the central unit is authorized to communicate with the peripheral wheel units.

7. The method as claimed in claim 1, wherein, during a given communication session opened with the target peripheral wheel unit, the method further comprises:

sending, by the central unit, he encrypted information to the target peripheral wheel unit by way of proof of authentication without using the server.

8. A system comprising:

a central unit, and peripheral wheel units carrying out measurements on tires that are mounted on wheels of a motor vehicle, the peripheral wheel units being wirelessly connected to one another, wherein:

the central unit is configured to communicate an identifier and a password to each peripheral wheel unit, and authentication information to a server for establishing a secure link so that the server may recognize a peripheral wheel unit identifier of a target peripheral wheel unit of one or more of the peripheral wheel units;

the target peripheral wheel unit being configured to generate a new random session code and sending the new random session code to the central unit;

the central unit being configured to transmit, the central unit identifier, the peripheral wheel unit identifier of the target peripheral wheel unit, and the new random session code to the server to request a proof of authentication so that the central unit obtains administrative rights over the target peripheral wheel unit;

the server being configured to:

perform a first encryption using a shared encryption key recognized by a server identifier and the new random session code to form a random and shared dynamic temporary first encryption key;

perform a second encryption using the central unit identifier and the dynamic temporary first encryption key to generate encrypted central-unit information for proof of authentication; and transmit the encrypted central-unit information to the central unit;

the central unit being configured to transmit the encrypted central-unit information to the target peripheral wheel unit; and the target peripheral wheel unit being configured to:

perform the first encryption using the shared encryption key and the new random session code, to form a temporary second encryption key;

decrypt the encrypted central-unit information using the temporary second encryption key to obtain a decrypted identifier;

compare the decrypted identifier with the central unit identifier; and authenticate the central unit when the comparison results in a match.

9. A method for carrying out measurements on tires of a motor vehicle, the motor vehicle including a central unit, and peripheral wheel units, the method comprising:

communicating, by the central unit, a central unit identifier and a password to one or more peripheral wheel units, and authentication information to a server for establishing a secure link so that the server may recognize a peripheral wheel unit identifier of a target peripheral wheel unit of the one or more peripheral wheel units;

generating, by the target peripheral wheel unit a new random session code and sending the new random session code to the central unit;

transmitting, by the central unit to the server, the central unit identifier, the peripheral wheel unit identifier of the target peripheral wheel unit, and the new random session code to request a proof of authentication so that the central unit obtains administrative rights over the target peripheral wheel unit;

performing, by the server, a first encryption using the shared encryption key recognized by a server identifier and the new random session code to form a random and shared dynamic temporary first encryption key;

performing, by the server, a second encryption using the central unit identifier and the dynamic temporary first encryption key to generate encrypted central-unit information for proof of authentication;

transmitting, by the server, the second encrypted information to the central unit;

transmitting, by the central unit, the second encrypted information to the target peripheral wheel unit;

performing, by the target peripheral wheel unit, the first encryption using the shared encryption key and the new random session code, to form a temporary second encryption key;

decrypting, by the target peripheral wheel unit, the encrypted central-unit information using the temporary second encryption key to obtain a decrypted identifier;

comparing, by the target peripheral wheel unit, the decrypted identifier with the central unit identifier; and authenticate the central unit when the comparison results in a match.

* * * * *